(12) United States Patent
Lee et al.

(10) Patent No.: US 7,028,975 B2
(45) Date of Patent: Apr. 18, 2006

(54) FLUSH VALVE STRUCTURE

(76) Inventors: Kuo-Chou Lee, No. 93, Shangren St., Nuannuan District, Keelung City (TW); Tsan-Chang Huang, 5F, No.65, Fuguo Rd., Shilin District, Taipei City (TW); Chi-Chin Hsu, 4F, No.21, Lane 248, Sec.4, Zhongxiao E Rd., Da-an District, Taipei City (TW)

( * ) Notice: Subject to any disclaimer, the term of this patent is extended or adjusted under 35 U.S.C. 154(b) by 0 days.

(21) Appl. No.: 10/890,277

(22) Filed: Jul. 14, 2004

(65) Prior Publication Data

US 2006/0011874 A1    Jan. 19, 2006

(51) Int. Cl.
*F16K 31/12* (2006.01)

(52) U.S. Cl. .................. 251/26; 251/29; 251/30.02; 251/40

(58) Field of Classification Search .................. 251/26, 251/29, 30.02, 30.01, 40
See application file for complete search history.

(56) References Cited

U.S. PATENT DOCUMENTS

| | | | | |
|---|---|---|---|---|
| 3,905,575 A | * | 9/1975 | Zeuner et al. | 251/29 |
| 4,201,362 A | * | 5/1980 | Nishimi et al. | 251/29 |
| 5,125,621 A | * | 6/1992 | Parsons et al. | 251/45 |
| 5,362,026 A | * | 11/1994 | Kobayashi et al. | 251/30.02 |
| 5,456,279 A | * | 10/1995 | Parsons et al. | 251/40 |
| 6,253,784 B1 | * | 7/2001 | Simoens | 251/26 |
| 6,659,420 B1 | * | 12/2003 | Hwang et al. | 251/40 |
| 6,805,328 B1 | * | 10/2004 | Filkovski et al. | 251/29 |
| 6,840,496 B1 | * | 1/2005 | Maercovich et al. | 251/40 |
| 6,845,524 B1 | * | 1/2005 | Hwang | 251/40 |
| 6,871,835 B1 | * | 3/2005 | Parsons | 251/30.03 |

FOREIGN PATENT DOCUMENTS

| | | |
|---|---|---|
| TW | 174370 A | 12/1991 |
| TW | 258240 A | 9/1995 |
| TW | 310737 A | 6/1997 |

\* cited by examiner

*Primary Examiner*—John Bastianelli
(74) *Attorney, Agent, or Firm*—Birch, Stewart, Kolasch & Birch, LLP

(57) ABSTRACT

A flush valve structure to control flush water through a pressure difference mainly includes a case, a solenoid assembly, an upper intermediate board, a lower intermediate board and a main water ball. The upper intermediate board has a small water pressure release hole. The lower intermediate board has a holding trough mating a medium water valve. The solenoid assembly can open the small water pressure release hole to generate a pressure difference to actuate the medium water valve to form a greater pressure difference so that the main water ball is lifted rapidly to fully open the a main water discharge opening to flush maximum amount of water in a shortest period at the flushing start time.

3 Claims, 8 Drawing Sheets

FLUSH VALVE STRUCTURE

FIELD OF THE INVENTION

The present invention relates to a flush valve structure and particularly to a flush valve for flushing toilets and urinary either manually or automatically.

BACKGROUND OF THE INVENTION

Conventional "channel type" flush valves use a pressure difference to open or close a water outlet. The automatic flush valve controlled by electronic means also adopts channel type flushing. The conventional automatic flush valve uses a small channeling water flow to generate a pressure difference to control opening and closing of the water outlet to flush a greater amount of water. In practice, while a small amount of electric power may control a smaller pressure release hole to channel a small water flow, the small water flow cannot quickly release the pressure and the main water ball cannot be lifted quickly to flush the water rapidly at a greater amount. Therefore water discharge time of the small water flow has to be extended. As a result, flush time has to be lengthened and water consumption has to increase to generate adequate siphonic effect to flush the wastes in toilet away. More details of the structure and function of the conventional flush apparatus are elaborated as follow:

1. R.O.C. patent publication No. 310737 entitled "Manual and automatic flush valve" submitted by the Applicant has a solenoid stem which is movable up and down to open and close a pressure release hole formed in an annular trough of an intermediate board. An automatic detected water pressure is released through the pressure release hole to allow a smaller water flow to control a larger water flow. However it is applicable only to the urinary, not desirable for flushing the toilet. As the toilet needs a greater amount of flush water, using the up and down movement of the solenoid valve stem to open and close the pressure release hole of the intermediate board can lift the main water ball quickly, but it still cannot generate a great amount of water in a given time due to the urinary does not need a greater amount of water. Hence it is not suitable for flushing toilets that require a great amount of discharge water to generate the siphonic effect.

2. There are some other conventional toilet flushing apparatus that adopt a sensor to detect user's body movement. For instance, R.O.C patent No. 174370 entitled "Automatic detection flushing apparatus for toilets" and No. 258240 entitled "Attached automatic flushing device for toilets" disclose a technique which includes a control circuit built on a membrane sensor. However, the membrane is easily damaged by the vibration of water pressure. The valve also is quite bulky. There is still room for improvement.

In view of the problems set forth above, to design a flush valve which does not consume electric power in a given size, and can release the pressure quickly in a given time to flush effectively is an issue pursued in the industry, and also is a goal of the present invention.

SUMMARY OF THE INVENTION

Therefore the primary object of the present invention is to solve the aforesaid problems. The invention provides a flush valve structure that can rapidly release pressure in a given size without consuming electric power to discharge maximum amount of water in a shortest time period from the flushing start time.

Another object of the invention is to provide a flush valve structure that has a solenoid assembly to automatically detect and open a small water pressure release hole to open a medium water pressure release hole so that a main water ball may be lifted to provide automatic flushing. In addition, the flush valve structure also has a manual flush apparatus for manual operation when the electric power of the solenoid is depleted or malfunction occurs.

The flush valve structure according to the invention includes:
  a case which has a housing chamber, a main water flow inlet, a water discharge opening, a water outlet and a pressure release passage;
  a solenoid assembly having a rod;
  an upper intermediate board having a small water pressure release hole and a small water passage;
  a lower intermediate board having a holding trough which contains a medium water pressure release hole and a medium water passage. The holding trough is coupled with a mating medium water valve; and
  a main water ball having a bore.

The rod of the solenoid assembly may be moved to open the small water pressure release hole to generate a pressure difference so that the medium water valve opens the medium water pressure release hole to generate a greater pressure difference to allow the main water ball to open rapidly and fully so that maximum amount of water flushes out at the shortest time period from the flushing start time.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
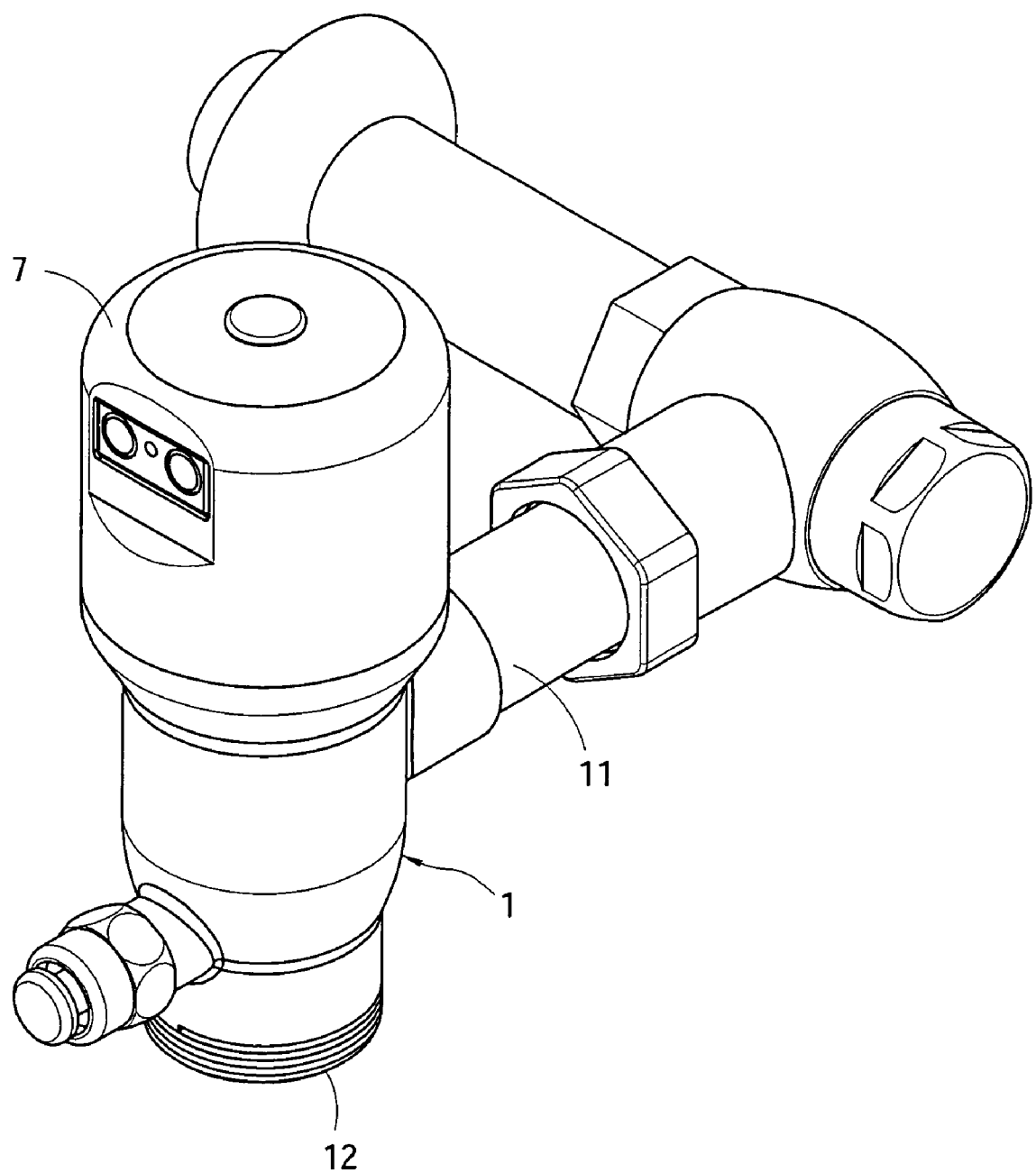
FIG. 1 is a perspective view of the present invention.
Figure 2:
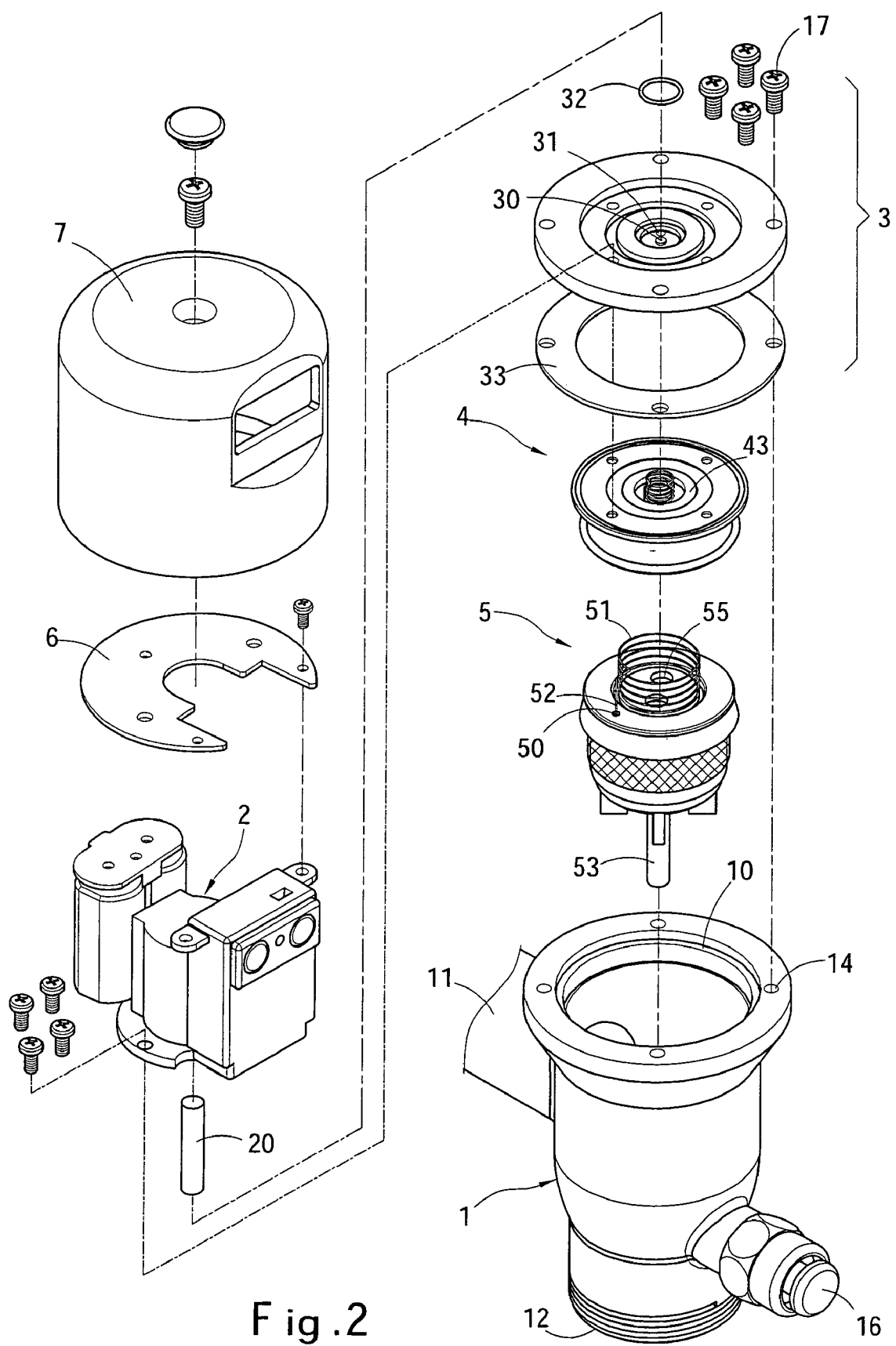
FIG. 2 is an exploded view of the present invention.
Figure 3:
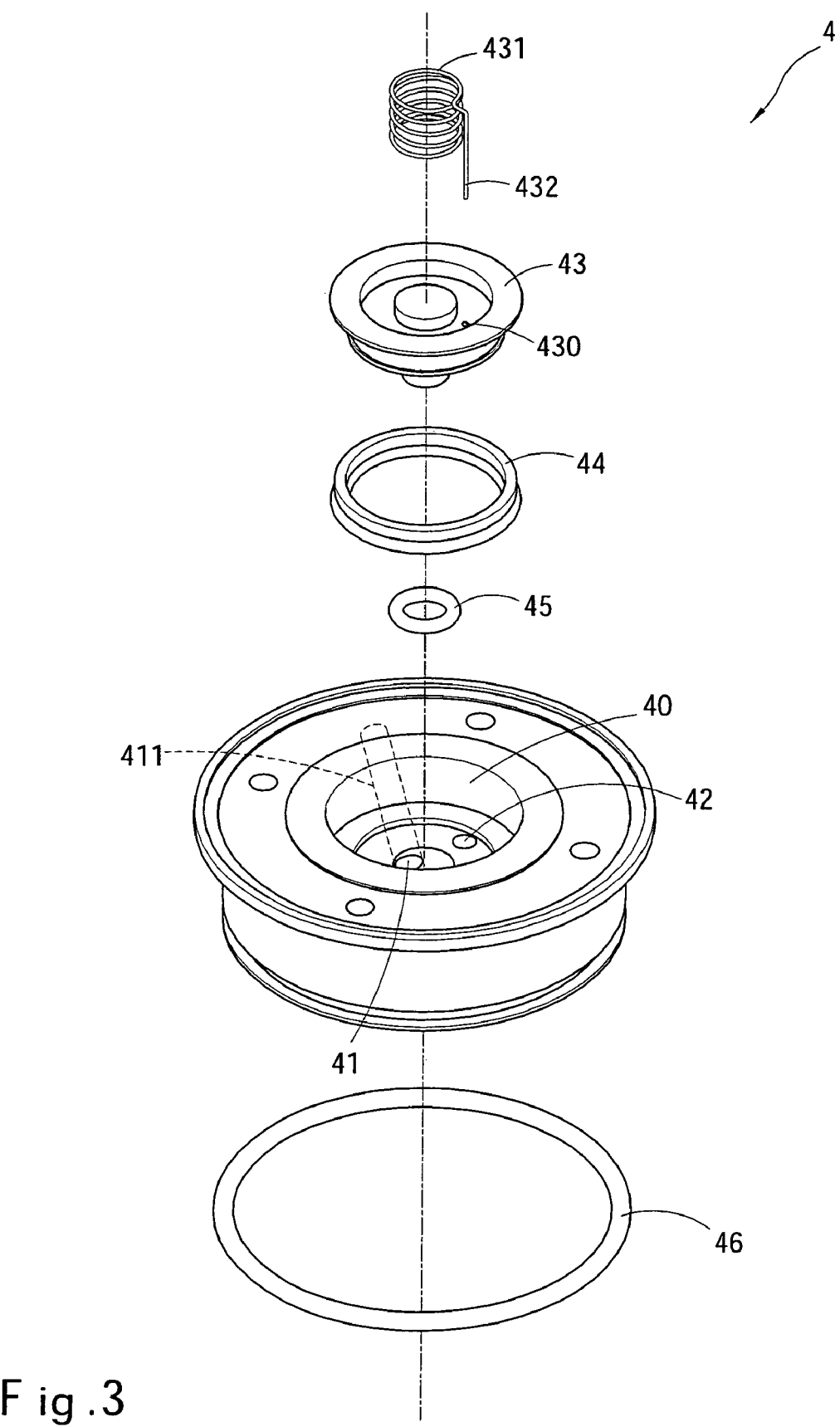
FIG. 3 is an exploded view of the lower intermediate board.
Figure 4:
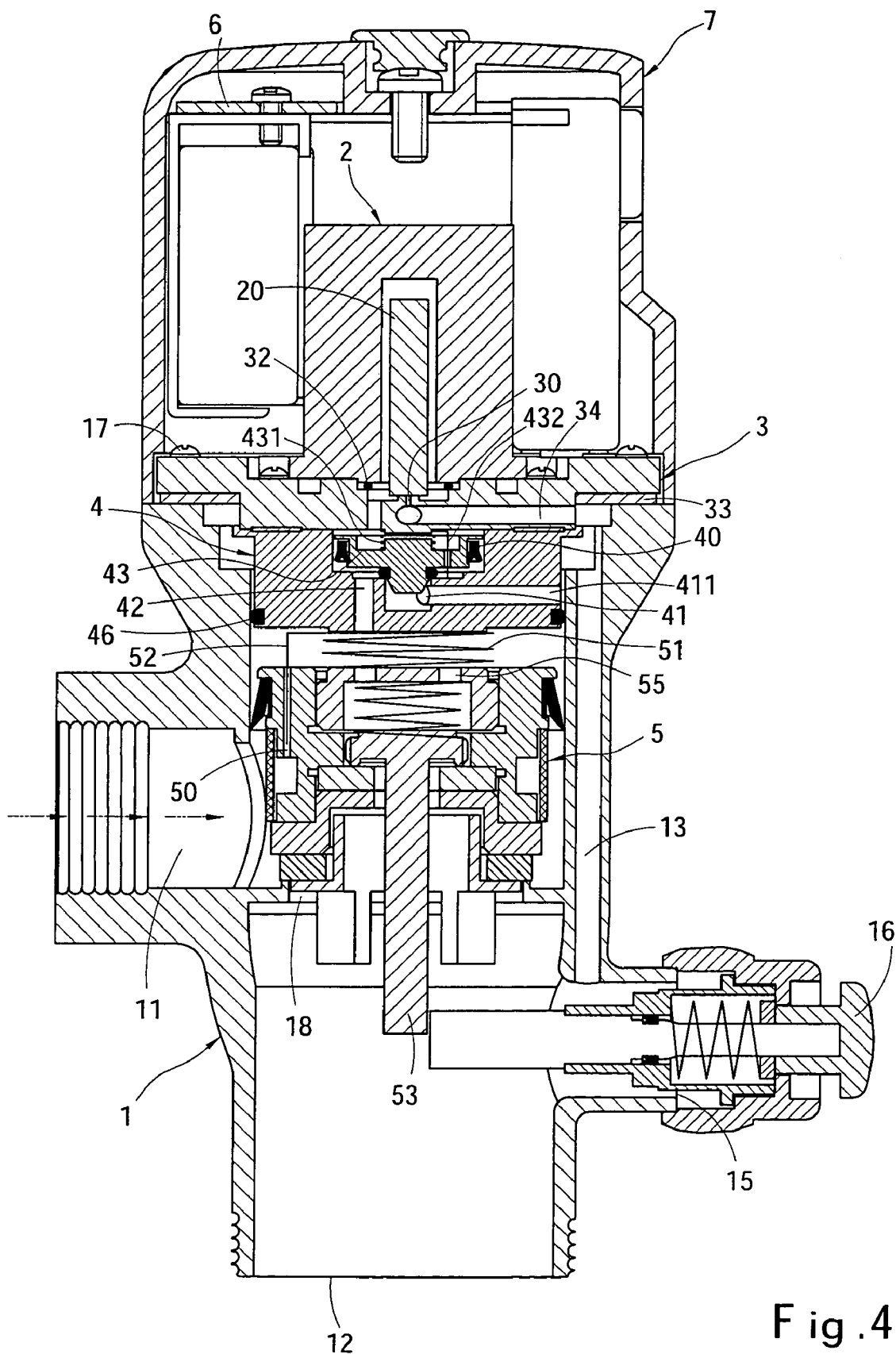
FIG. 4 is a sectional view of the invention.

The flush valve structure according to the present invention has a lower intermediate board 4 which has a medium water pressure release hole 41 and a passage 411 that have a greater diameter to release the pressure at a faster speed therefore to form a greater pressure difference to lift a main water ball 5 rapidly to fully open a main water discharge opening 18, thereby maximum amount of water may be discharged at a shortest period from the flushing start time.

Please referring to FIGS. 1 through 4, the flush valve structure according to the present invention includes:
  a case 1 which has a housing chamber 10, a main water inlet 11, a main water discharge opening 18, a water outlet 12, a pressure release passage 13, and a plurality of screw holes 14 formed on an upper rim;
  a solenoid assembly 2 having a rod 20;
  an upper intermediate board 3 fastened to a lower side of the solenoid assembly 2 and the case 1 having a small water pressure release hole 30, a small water passage 31, a washer 32 and a seal pad 33. The rod 20 of the solenoid assembly 2 controls opening and closing of the small water pressure release hole 30;

a lower intermediate board 4 fastened to the upper intermediate board 3 having a holding trough 40, a first seal ring 44, a second seal ring 45 and a third seal ring 46. The holding trough 40 contains a medium water pressure release hole 41 and a medium water passage 42. The holding trough 40 is coupled with a mating medium water valve 43 to control opening and closing of the medium water pressure release hole 41. The medium water valve 43 has an anchor bore 430 to couple with a first leg 432 of a first spring 431 located on an upper side of the medium water valve 43. The first spring 431 compresses the lifting medium water valve 43 to return to its original position. The first leg 432 helps to clear dirt in the anchor bore 430; and a main water ball 5 located in the housing chamber 10 to control opening and closing of the main water discharge opening 18 having a bore 50 to couple with a second leg 52 of a second spring 51 located between the main water ball 5 and the lower intermediate board 4. The second leg 52 helps to clear dirt in the bore 50.

After the elements set forth above have been assembled, the solenoid assembly 2, upper intermediate board 3 and lower intermediate board 4 are fastened to the screw holes 14 of the case 1 through screws 17. An auxiliary plate 6 is fastened to the upper side of the solenoid assembly 2 and is covered by and fastened to an upper cap 7. The rod 20 of the solenoid assembly 2 can open the small water pressure release hole 30 to generate a pressure difference to actuate the medium water valve 43 to open the medium water pressure release valve 41 to form a greater pressure difference so that the main water ball 5 can quickly open the main water discharge opening 18 to discharge maximum amount of water in the shortest period at the flushing start time.

Figure 5:
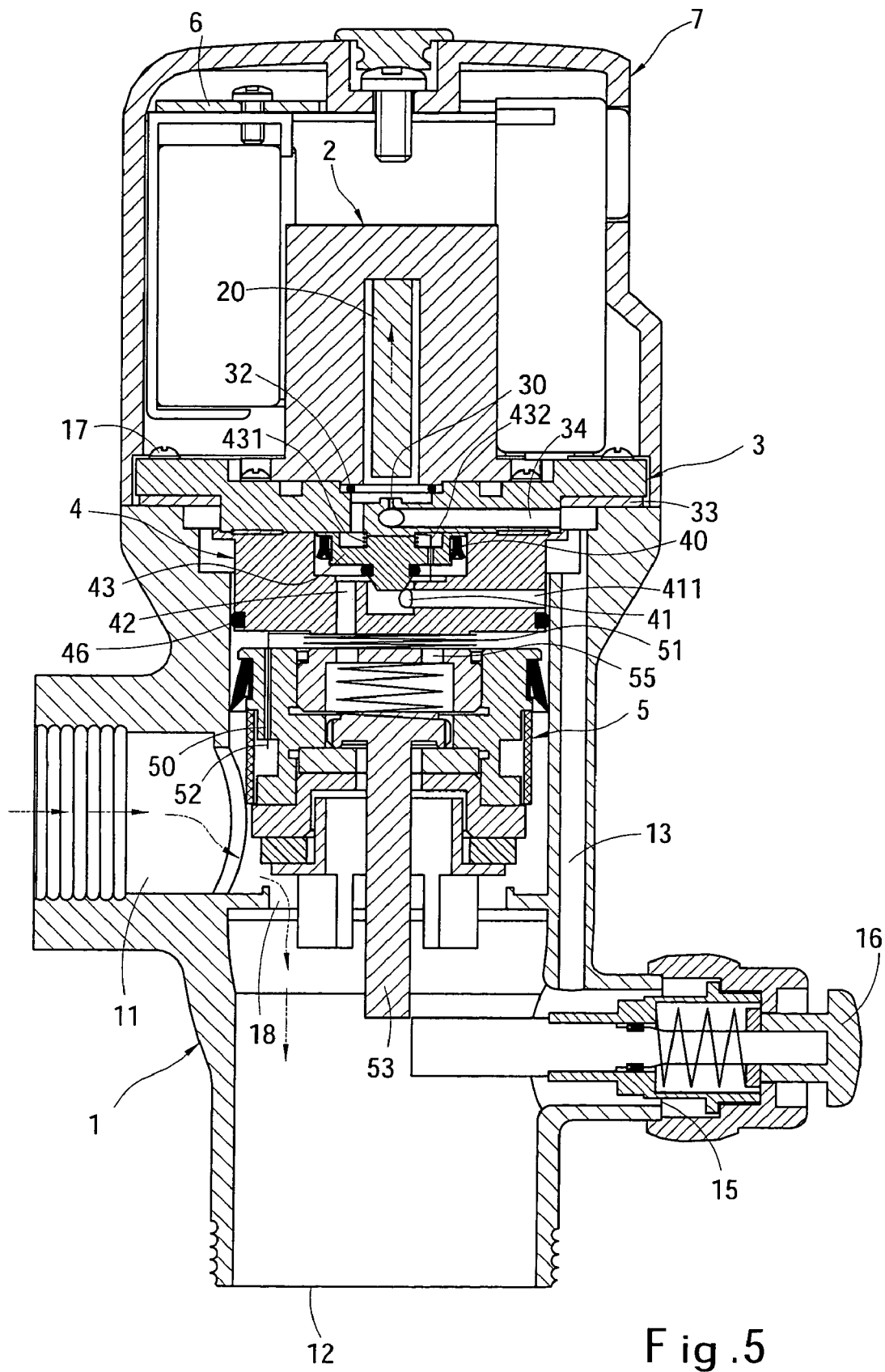
FIG. 5 is a schematic view of a first embodiment of the invention in an operating condition.

Refer to FIG. 5 for a first embodiment of the invention. It employs an automatic detection flush valve to flush water. The solenoid valve assembly 2 is controlled by a detection switch to move the rod 20 up and down. When the rod 20 is moved upwards, the small water pressure release hole 30 of the upper intermediate board 3 is opened, water contained in the upper intermediate board 3 flows through the small water pressure release hole 30 and a passage 34 into the pressure release passage 13 of the case 1 and into the water outlet 12 to release the pressure. The pressure becomes unbalanced, the medium water valve 43 is lifted instantly, and the pressure is released rapidly through the medium water pressure release hole 41 and the passage 411. Thereby the main water ball 5 is lifted to open the main water discharge opening 18 to allow the water to pour into the water outlet 12 to perform flush operation. On the contrary, when the stem 20 of the solenoid assembly 2 is moved downwards to close the small water pressure release hole 30, water flows through the bore 50 of the main water ball 5 until the water pressure of the filling water is equal to the water pressure in the main water inlet 11, then the main water ball 5 moves downwards to close the water outlet 12 to stop flushing.

Figure 6A:
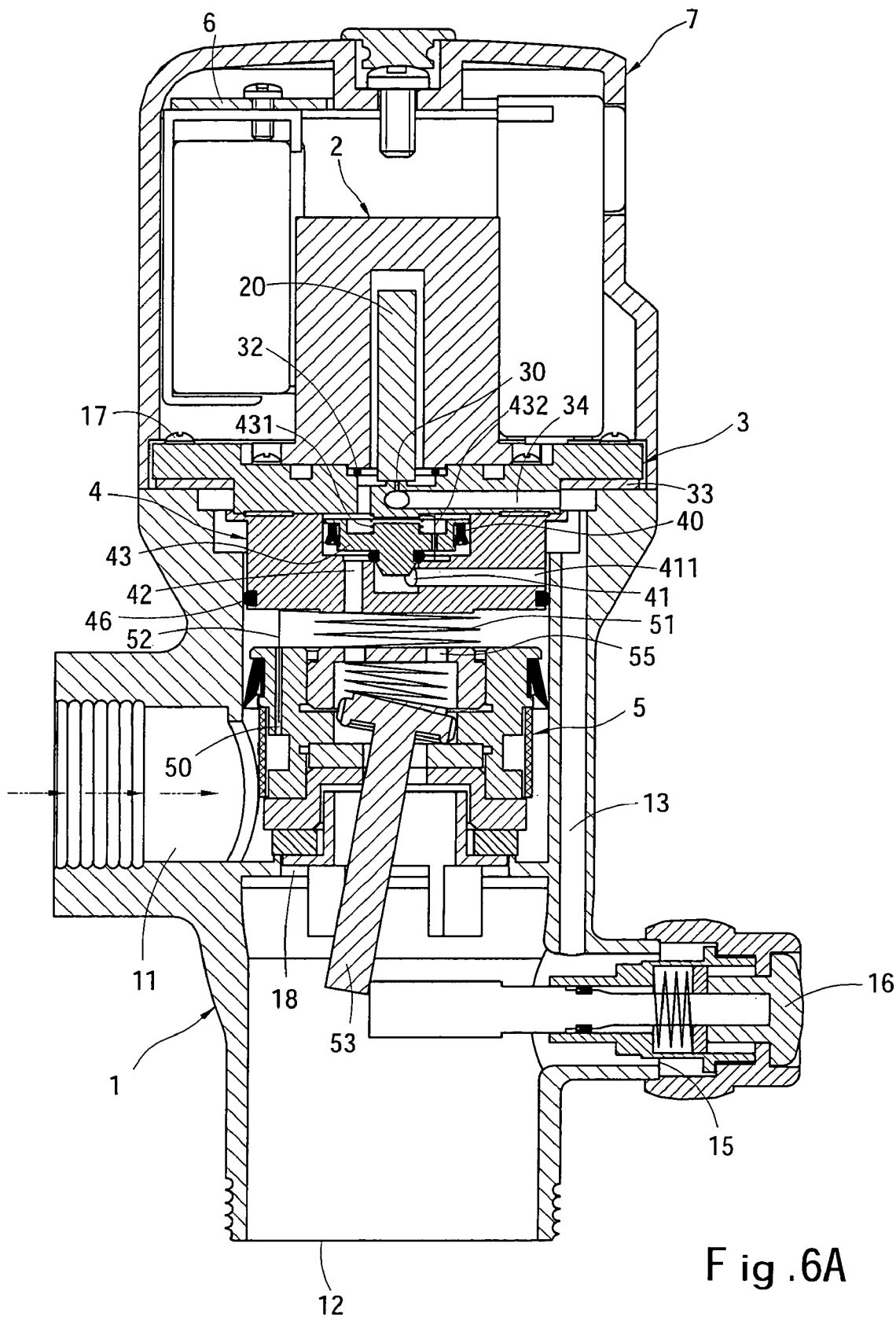
FIGS. 6A, 6B and 6C are schematic views of further operations of the present invention.
Figure 6B:
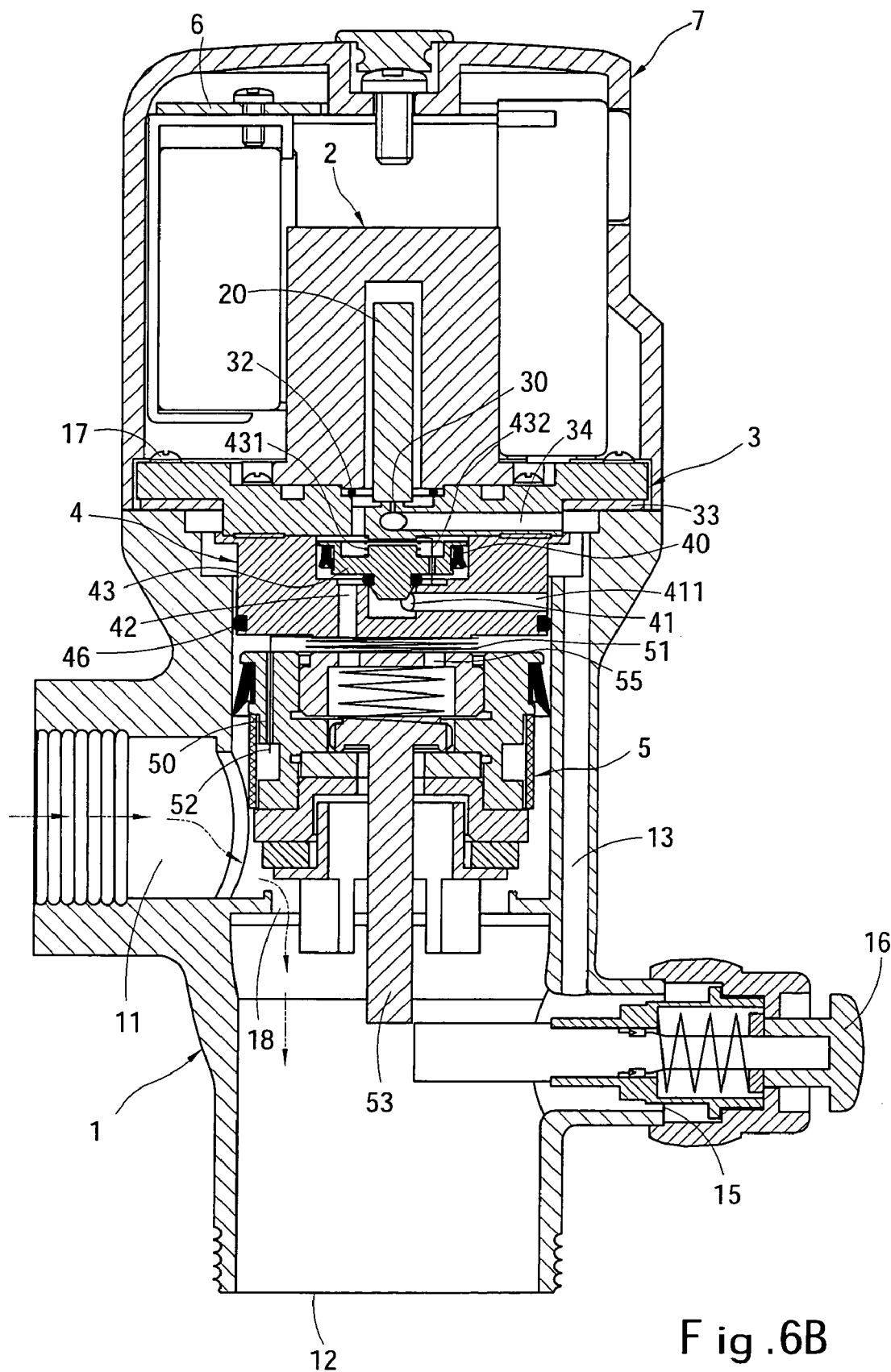
Figure 6C:
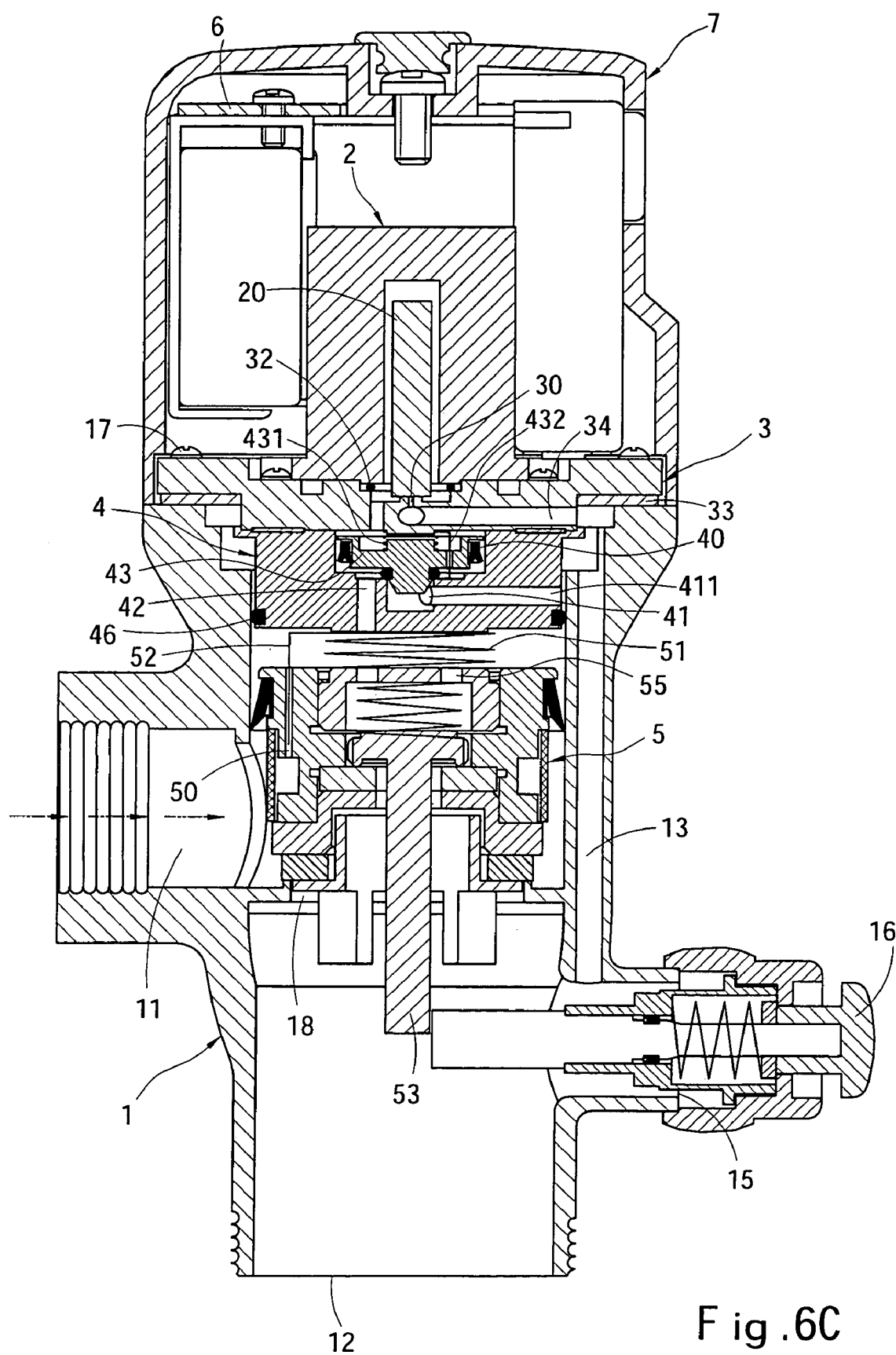

Refer to FIGS. 6A, 6B and 6C for a further operation of the invention that is flushed manually. The main water ball 5 has a pressure release stem 53 and a pressure release opening 54 and a second water outlet 55. The case 1 further has a button opening 15 to couple with a button 16 which may be depressed to push the pressure release stem 53 and open the pressure release opening 54 to discharge water and generate a pressure difference so that the main water ball 5 may be lifted to open the main water discharge opening 18 to flush water. On the contrary, when the water flows in through the bore 50 of the main water ball 5 and the pressure is balanced, the main water ball 5 returns to its original position to close the main water discharge opening 18 to stop flushing.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A flush valve structure to control water flow through a pressure difference, comprising:

a case which has a housing chamber, a main water inlet, a main water discharge opening, a water outlet and a pressure release passage;

a solenoid assembly having a rod;

an upper intermediate board fastened to a lower side of the solenoid assembly and the case having a small water pressure release hole which is opened or closed by the rod of the solenoid assembly and a small water passage;

a lower intermediate board fastened to the upper intermediate board having a holding trough which contains a medium water pressure release hole and a medium water passage and couples with a mating medium water valve to control opening and closing of the medium water pressure release hole; and a main water ball located in the housing chamber to control opening and closing of the main water discharge opening having a bore;

wherein the rod of the solenoid assembly opens the small water pressure release hole to generate a pressure difference to actuate the medium water valve to open the medium water pressure release hole to form a greater pressure difference so that the main water ball rapidly and fully opens the main water discharge opening; and wherein the main water ball has a pressure release stem, a pressure release opening and a second water outlet, the case having a button opening to couple with a button which is depressable to push the pressure release stem and open the pressure release opening to generate a pressure difference so that the main water ball rapidly and fully opens the main water discharge opening to flush water, and the main water ball returns to its original position when the pressure is balanced to close the main water discharge opening and stop flushing.

2. The flush valve structure of claim 1, wherein the medium water check valve has an anchor bore and a first spring located on an upper side thereof to compress the lifting medium water valve to return to its original position, the first spring having a first leg to couple with the anchor bore to clear dirt in the anchor bore.

3. The flush valve structure of claim 1 further having a second spring between the main water ball and the lower intermediate board, the second spring having a second leg to couple with the bore to clear dirt in the bore.

* * * * *